United States Patent [19]
Brodie et al.

[11] Patent Number: 5,666,114
[45] Date of Patent: Sep. 9, 1997

[54] METHOD AND MEANS FOR MANAGING LINEAR MAPPED ADDRESS SPACES STORING COMPRESSED DATA AT THE STORAGE SUBSYSTEM CONTROL UNIT OR DEVICE LEVEL

[75] Inventors: Robert Bruce Brodie, San Jose; Joe-Ming Cheng, Cupertino; Lawrence John Garibay, San Jose; Jaishankar Moothedath Menon, San Jose; Chan Yiu Ng, San Jose; Tram Thi Mai Nguyen, San Jose, all of Calif.

[73] Assignee: International Business Machines Corporation, Armonk, N.Y.

[21] Appl. No.: 343,316

[22] Filed: Nov. 22, 1994

[51] Int. Cl.⁶ .................................................. G11B 20/00
[52] U.S. Cl. .................................................. 341/50; 711/100
[58] Field of Search ....................... 341/50, 58; 395/427, 395/425

[56] References Cited

U.S. PATENT DOCUMENTS

| | | | |
|---|---|---|---|
| 4,207,609 | 6/1980 | Luiz et al. | 364/200 |
| 4,914,656 | 4/1990 | Dunphy, Jr. et al. | 371/10.2 |
| 4,916,605 | 4/1990 | Beardsley et al. | 364/200 |
| 4,947,447 | 8/1990 | Miyaoka et al. | 382/56 |
| 5,237,460 | 8/1993 | Miller et al. | 360/8 |
| 5,237,675 | 8/1993 | Hannon, Jr. | 395/425 |
| 5,247,638 | 9/1993 | O'Brien et al. | 395/425 |
| 5,305,295 | 4/1994 | Chu | 369/30 |

OTHER PUBLICATIONS

M. Rosenblum et al, The Design and Implementation of a Log-Structured File System, pp. 1–15, 1991 ACM 089791-447-3/91/0009/0001 IBM-SJ-703.

Primary Examiner—Jeffrey A. Gaffin
Assistant Examiner—Peguy Jean Pierre
Attorney, Agent, or Firm—Baker, Maxham, Jester & Meador

[57] ABSTRACT

A constant size storage can be managed to preserve locality of referencing where it is partitioned into linear addressable storage space for compressed symbol strings and a linked list addressable space for overflowing portions of each compressed string, a token to the overflow being embedded in the linear address. The linear space is readjusted periodically in a direction so as to maintain the amount of available overflow within to lie within a certain range of current usage. Changes in compression statistics result in changing overflow usage requiring readjustment to minimize internal fragmentation etc.

10 Claims, 7 Drawing Sheets

DASD DEVICE LEVEL WRITE AND REWRITE PATHS FOR RESIZING COMPRESSED LINEAR AND OVERFLOW SPACES

DASD ARRAY STORAGE SUBSYSTEM
AND DATA PATHS FOR RESIZING AND
REWRITING DASD BASED ADDRESS SPACES

DASD DEVICE LEVEL WRITE AND REWRITE PATHS FOR RESIZING COMPRESSED LINEAR AND OVERFLOW SPACES

SYMBOL PROBABILITY DISTRIBUTION
SUPERIMPOSED ONTO COMPRESSION RATIO

MAPPING OF UNCOMPRESSED DATA INTO
COMPRESSED LINEAR AND OVERFLOW SPACES

RECORDING DENSITY
VARIES AS RADIAL
DISTANCE

CONTRAST DISK LAYOUTS UTILIZING LINEAR & OVERFLOW REGIONS

LINEAR MAPPING OF DASD TRACKS INTO COUNTERPART COMPRESSED AND OVERFLOW REGIONS

STEP 1

STEP 2

STEP 3

STEP 4

DYNAMIC ALLOCATION OF LINEAR & OVERFLOW SPACE

- ☐ Primary Space Used
- ▥ Primary Space Unused
- ▤ OverFlow Space Pre-Allocated
- ▩ OverFlowSpace Used

DYNAMIC ALLOCATION OF LINEAR & OVERFLOW SPACE (CONT'D)

METHOD AND MEANS FOR MANAGING LINEAR MAPPED ADDRESS SPACES STORING COMPRESSED DATA AT THE STORAGE SUBSYSTEM CONTROL UNIT OR DEVICE LEVEL

FIELD OF THE INVENTION

This invention relates to managing compressed symbol strings in addressable memory or storage subsystems, and more particularly, to accessing methods and means for preserving locality of referencing in said memory or storage subsystems either over strings subject to the same compression ratio or over strings subject to different compression ratios.

DESCRIPTION OF RELATED ART

This section discusses models as applied to storage subsystems. This includes a log structured file/array (LSF/LSA) as applied to an array of direct storage access devices (DASDs). The issue involves the effect on the locality of referencing of compressed file, record, or page organized symbol strings derived from the same or dissimilar sources of compressed symbol strings.

STORAGE AND STORAGE MODELS

A storage subsystem comprises an alterable storage medium, an accessing mechanism, and an addressing protocol. Such a subsystem is attached to a host CPU. An operating system (OS) within the host CPU is responsive to access commands from one or more CPU executing applications. The access commands include one or more arguments defining addresses on the medium. The OS causes the accessing mechanism to position itself mechanically or electrically relative to the storage medium as a function of the addressing protocol and access command arguments. It then transfers symbol strings to or from the medium at the addressed locations.

In a hierarchical system, a model may be defined as the expected behavior of subsystems inferior to the referencing system. As applied to storage subsystems, a storage model is a view of storage as seen from the vantage of the CPU. Any storage model includes a protocol defining the manner of accessing and laying out the addresses in an abstract or logical space with provision for relating those logical addresses to locations in the alterable medium. However, the model need not bear any necessary resemblance to the underlying physical storage. This is illustrated by the virtual and real address dichotomy in which the contents of a logical space may be mapped one to one from consecutive addresses into a non-monotonic real address space and vice versa. The OS and storage subsystem perform the necessary translations. Also, the number of addresses constituting the logical or virtual spaces are usually larger the than number of addresses constituting the real address spaces. In this specification, no distinction is made between real and absolute addresses.

Log Structured Storage Model, Cached DASD Storage, And DASD Arrays

In the prior art, increased processor speeds have increased I/O demands on external storage. The engineering response assumed that for random read operations, repeated references to backing storage could be reduced by staging data to a large intermediate cache. Also, it was found that any write update path could be improved by buffering the updates and then asynchronously batch recording them on direct access storage devices (DASDs). This was taught in Beardsley et al, U.S. Pat. No. 4,916,605, "Fast Write Operations", issued Apr. 10, 1990.

The write path to DASD external storage could be optimized if it were managed as a semi-infinite tape whose fragmented storage extent was periodically garbage collected. Updated records would be written at the end of the log file in compressed form while preserving various affinities. Such a file management was termed a "log structured file".

It was discovered that if an array of N DASDs were synchronously accessed and data striped there across, then the data rate increased N*DASD rate and the logical track became N times the size of the DASD physical track etc. Relatedly, a DASD array managed as a log structure file is called a "log structured array" (LSA). Relatedly, an LSA is illustrated in O'Brien et. al., U.S. Pat. No. 5,247,638, "Apparatus For Compressing Data In A Dynamically Mapped Virtual Data Storage Subsystem", issued Sep. 21, 1990.

The Log Structured Storage Model And Compression

Rosenblum and Ousterhout "Design and Implementation of A Log Structured File System", SOSP-91, Monterey 1991 describe the UC Berkeley SPRITE log structured file (LSF). An LSF is a host organization of UNIX storage in which write efficiency and recovery is maximized by modeling storage as a shadow written near infinite tape with sufficient directories to minimize sequential scans to locate data. In an LSF, all live and updated files are rewritten at the end of the log after garbage collection. This is termed copying and compacting.

The log structured file organization increases efficiency of writing modified data. However, the penalties incurred include (1) losing seek affinity; (2) having to maintain a directory structure which keeps track of the dynamically changing physical location of logical blocks of information and; (3) having to periodically garbage collect together blocks that have not been modified and move them to new locations. The latter is necessitated in order to leave contiguous clean space for writing the large units of modified blocks from the log.

Modified LSA With Seek Affinity

Mattson et. al., SA9-93-047, "Managing A Log Structured DASD Array Using Write Age Separation And Read Activity Clustering", U.S. Ser. No. 08/196,047, now U.S. Pat. No. 5,551,003 filed Feb. 14, 1994 introduces the notion of "seek affinity". By this is meant the ratio of the average seek time while executing any given workload divided by the average seek time in accessing a random workload. The smaller the value of seek affinity, the better the performance.

In the copending application, Mattson achieves a smaller value of seek affinity by collecting all the write modified read active tracks and clean read active tracks either destaged from the cache or garbage collected from the LSA and rewriting them out to the LSA as segments into regions of contiguous segments of read active tracks. Also, all write modified read inactive tracks and clean read inactive tracks either destaged from cache or garbage collected from the LSA are collected and rewritten out to the LSA as segments into regions of contiguous segments of read inactive tracks. Garbage collection is initiated when the detected free space in a region falls below a threshold and continues until the collected segments exceed a second threshold.

Fuzzy Log Structured DASD Arrays

Brady et al, SA9-94-049, "Fuzzy Log Structured Disk Array", U.S. Ser. No. 08/241,897, filed May 11, 1994, discloses a method for writing updates in which only compressed updated tracks overflowing preallocated storage are written out as log structured files (shadow writing). This would preserve locality of referencing for records in the preallocated storage and avoid the complexity of Mattson. His protocol was to reserve at least 30% of the track space otherwise occupied by an uncompressed track + a 5% pad for compressed track expansion in the event the track is updated. The assumption is that the compression algorithm and the zero order statistics of strings subject to compression support at least a 3/1 ratio. In the event, that the compression ratio is less than 3/1, then significant fragmentation occurs because all strings exceeding the 35% of original length segment size would be written out as LSF/LSA files i.e. to the first available space.

Operating System Level Compressed Storage

Several commercial products such as Microsoft "DoubleSpace" and STAC Electronics Inc. "STACKER" provide compressed data and access on primary disk based storage. These products require that a fixed disk be partitioned into an uncompressed region or volume and one or more compressed regions or volumes. The uncompressed region stores some system files and the compressed volume or volumes as a single file. Access to the compressed data requires that the compressed volume or volumes be mounted and entered only via the compressed directory spanning the compressed volume or volumes. Thus, compressed files cannot be transparently accessed without first mounting the compressed volume and its directory.

SUMMARY OF THE INVENTION

It is object of this invention to devise a method and means for transparently accessing variable length compressed symbol strings in an addressable storage space while preserving locality of referencing where the strings have been subject to a constant compression ratio.

It is a related object to devise a method and means where the strings include those subject to different compression ratios.

It is a another object that the method and means map the variable length compressed symbol strings both ONE-TO-ONE and ONTO into fixed (constant) size logical or physical address spaces, the writable unit of storage being selected from the set consisting of a DASD track, a fixed length block, a page or the like.

It is yet another object that the method and means are transparent to higher level access methods and means.

In the first instance, the above objects are satisfied by a method and means in which the symbol strings have been subject to a common predetermined compression ratio r and written into a fixed addressable storage space S. The space S is partitioned into a linear address extent of N equal sized segments and an overflow extent of nominally N/2 segments. The compression ratio r is the one occurring at a 2 sigma or the like lower bound of a global Gaussian or Laplacian symbol probability distribution. The distribution is superimposed over a partially ordered range of compression ratios. The initial size of each linear segment is determined as an average uncompressed DASD track, fixed length block, or page size divided by the ratio r. Note, the ratio r is the ratio of uncompressed to compressed length of a symbol string forming any track, fixed length block, page or the like.

In this method, any portion of a compressed symbol string exceeding the size of its linear address segment has the excess written to a counterpart overflow segment with a link or pointer embedded in the linear or primary segment. If the overflow extent becomes saturated and the linear or primary extent does not, then additional overflow is obtained by reducing the size of the linear address extent. Likewise, if [RBB]the linearly addressable extent becomes saturated and the overflow extent is sparsely occupied, then additional linearly addressable space is reclaimed by reducing the size of the overflow area.

To manage this total fixed size address space dynamically, the linear and overflow extents are periodically or opportunistically rewritten as a function of whether the overflow has been over or underutilized as a percentage of its current size. For instance, if more than 5% of overflow area has been written, then the size of the segments in the linear addressable storage may be considered too small. Additional space would be reclaimed from the overflow area for N addresses and the linear segment size increased. If only 1% or 2% of the overflow were occupied, then the segment sizes of the linear addressable storage would be decreased and either additional addresses added or the area reclaimed for overflow.

Restated, the method and means of this invention compress Markov generated symbol strings ONE-TO-ONE and ONTO into counterpart linear address spaces. Any excess portion of any of the strings is written into a counterpart linked overflow segment transparent to any host CPU based storage manager. Overflow space is used adjustably with the linear space to maintain a constant sum. The relative size of the linear address extent and the segments contained varies as the source symbol probabilities (order statistics) vary over time. This is implemented by periodically or opportunistically rewriting the compressed strings into larger or smaller sized linear address segments, the sizing being in a direction so as to maintain the number of overflow addresses to lie in a predetermined percentage range (say 1% to 5%) of currently available overflow addresses. This permits update in place with a pointer over (chain) to any spill or overflow area.

A variant of this method occurs where linear address spaces are reserved as a function of the compression ratio of the strings recorded therein. Thus, a fixed size space S according to this invention can also comprise a linear address extent or primary region formed from bands of contiguous segments and an overflow region. The bands themselves may be variously located within the fixed size space. A band would be reserved for storing strings subjected to the same compression ratio. Thus, where strings would be received subject to compression ratios of 2/1, 1/1, 3/1, and 4/1, then four bands+overflow would be reserved. Operationally, one or more of the bands can be adjustably varied with the overflow extent as described above.

Advantageously, such a method and means are self scaling and preserve locality of referencing. The banding can be used to slowly adapt files in a background processing mode such as the rewriting of a log structured file into a linear addressing+overflow extent. This repacking of an entire DASD storage subsystem image also permits differential treatment of the bands. For instance, mature files subject to 3/1 compression 95% of the time would have its overflow sampled and it relationship between the overflow and linear address segments adjusted within tolerances dissimilar to that of newly formatted files subject to 2/1 compression 75% of the time. Recall that mature files are usually subject to read access and less frequently subject to update.

BRIEF DESCRIPTION OF THE DRAWING

The forgoing features and advantages of the invention may be better understood and appreciated from a detailed description of at least one embodiment thereof when taken together with the figures of the drawing in which.

DESCRIPTION OF THE PREFERRED EMBODIMENT

The invention may be practiced at any one of several levels or echelons within a DASD storage subsystem, namely, at the subsystem control unit level or at the storage device level. In the next several paragraphs, there is set out a brief exposition of the subsystem and device environments.

Figure 1:
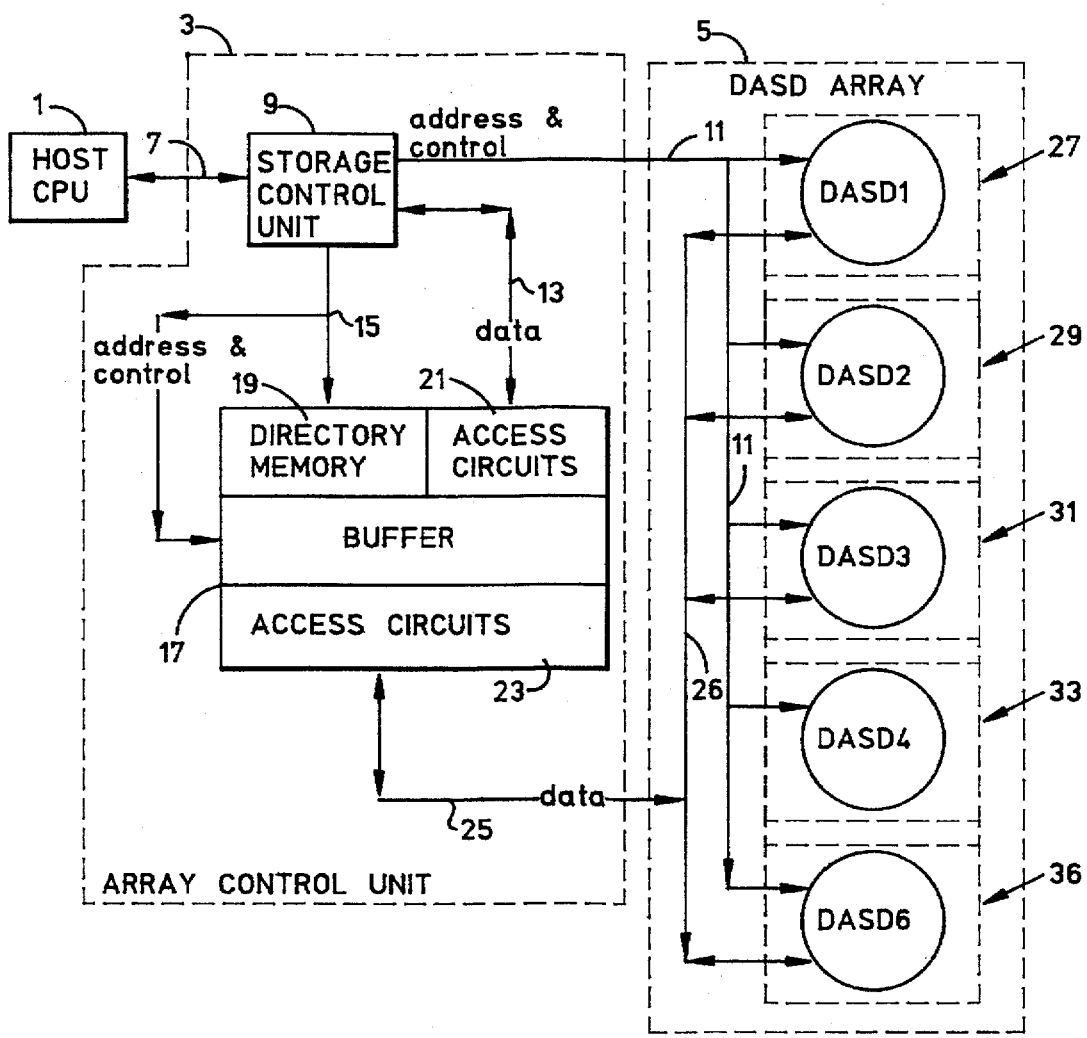
FIG. 1 shows a DASD array storage subsystem exhibiting major access paths to data within which the linear address and overflow spaces of the invention can be resized.

Referring now to FIG. 1, there is shown a system including a host processor 1, and an external store. The latter is formed from an array 5 of N+1 DASDs, and an array control unit 3 coupling the processor to the array. Processor 1 preferably comprises at least one or more processors used to execute application and system code; memory to hold application code, system code, and data; and a means responsive to read and write calls from executing applications for accessing information through the system code (otherwise termed operating system such as MVS, AIX, CICS etc.) not otherwise in memory from the external store.

Typically, as described in Luiz et al, U.S. Pat. No. 4,207,609, "Method and Means for Path Independent Device Reservation and Reconnection in a Multi-CPU and Shared Device Access System", issued Jun. 10, 1980, and the references cited therein, there is shown an architecture for establishing an access path to data by which a processor host or CPU obtains variable or fixed length records from an attached DASD storage subsystem.

Under this architecture, the CPU creates a dedicated virtual processor for accessing and transferring data streams over demand/response interfaces to attached subsystems using chains of special purpose I/O instructions termed "channel command words" or CCWs. The CCWs are stored in a portion of CPU main memory in support of fast calls. When an application program executes a read or write requiring access to external storage (usually attached DASD storage), then the CPU S/370 MVS operating system initiates such a reference with a START I/O command. This command causes the CPU to suspend its multi-processing state, transfer to the CCW chain, and reestablish its prior state after CCW chain completion.

Referring again to FIG. 1, processor 1 sends an appropriate CCW chain to storage control unit (SCU) 9 over path 7. SCU 9 "interprets" each of the CCW's and responsively applies counterpart control and address signals over path 15 to directory memory 19 to ascertain location of data either in the buffer 17 or on DASD array 5. Data is transferred between host processor 1 and array 5 over a path including path 7, SCU 9, path 13, access circuits 21, buffer means 17, access circuits 23, and path 26. The host is accessing data using a storage model maintained by the array control unit 3. This is expressed by the destaging (writing) of buffer 17 contents onto the array DASDs (DASD1–DASDn+1) in predetermined patterns and conditions.

SCU 9 and buffer 17 comprise at least one or more microprocessors with sufficient associated memory for storing software for interpreting the CCWs and managing the buffer and the DASD array according to the prevailing storage, a directory located in directory memory 19 showing the mapping from logical blocks of data to physical data blocks, means for forming a group of blocks having a logical affinity and computing parity or other redundancy code thereover, buffer means 17 for holding modified blocks of data, and paths 11 and 25 for moving data & control signals between any DASD and buffer means 17.

The DASD array 5 may be managed by SCU 9 as a RAID 3 or a RAID 5 array as defined by the aforementioned Patterson reference. In a RAID 3 embodiment for DASD array 5, the data string segmentation or striping, parity assignment to the blocks of a group, synchronous accessing of a parity group or block from counterpart DASDs and the array operation in both fault tolerant and degraded modes is set out in Dunphy et al, U.S. Pat. No. 4,914,656, "Disk Drive Memory", issued Apr. 3, 1990.

Figure 2:
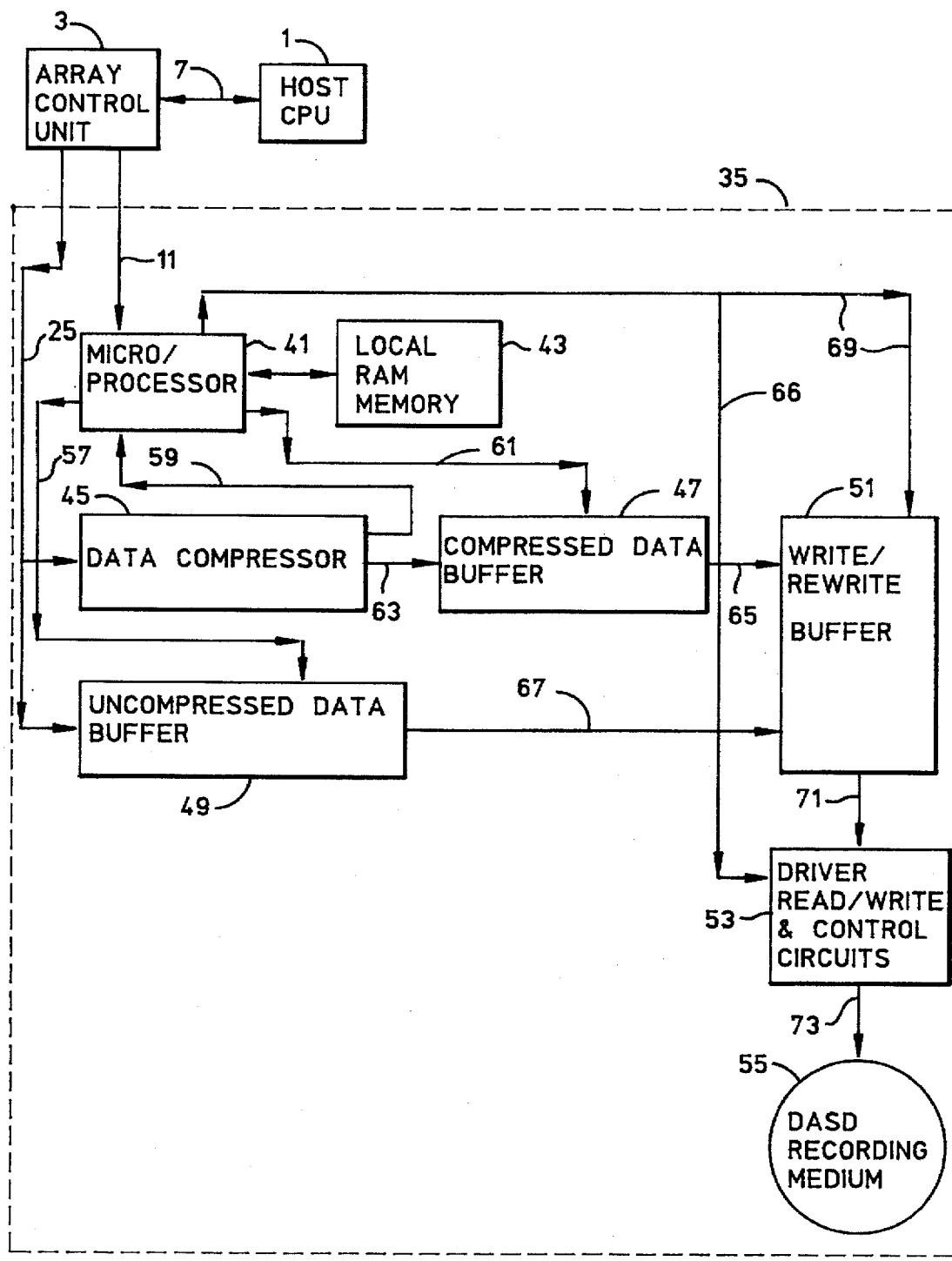
FIG. 2 depicts a write path through the control electronics of a DASD shown in FIG. 1 which can accommodate resizing on the fly through compression and reblock buffering.

Referring now to FIG. 2, there is shown a logical block diagram of the write path aspects of a DASD device 35. Device 35 is one of several forming the DASD array 6 depicted in FIG. 1. More particularly, device 35 interacts with array control unit 7 over data path 25 and address and control path 11. The address and control path 11 terminates in a microprocessor 41 while the data path 25 terminates in a data compressor 45 and a buffer 49 for uncompressed data. Processor 41 interacts with a local control memory 43 storing all or part of a DASD device software driver. Also, processor 41 receives the byte count output from compressor 45 over path 59. The processor executes control over the output of a compressed data buffer 47, a write/rewrite buffer 51, data buffer 49, and driver control circuits 53 over respective paths 61, 69, 57, and 66. The positioning of the head/disk arm assembly (not shown) is regulated by the control circuits 53 over path 73 to respectively record a symbol sequence at one or more addresses on a disk recording medium 55 in the write mode or read sequences from selected addresses in the read mode.

In this invention, when linear and overflow spaces are resized, the current linear and overflow space contents are read into buffer 17 of array control unit 3 shown in FIG. 1 over path 25 and access circuits 23. The actual re/writing or resizing of the blocks can be done on the fly through the compression facility in FIG. 2, partially blocked in buffer 51, and written out to disk 55 from buffer 51. Note, processor 41 controls any tendency of a data sequence to expand by virtue of the fact that the byte size of the compressed and uncompressed copies of each string are both available to it. A selection of the smaller string is made by selectively inhibiting via control paths 49 and 61 buffer 49 output to buffer 51 over path 67 or buffer 47 output over path 65.

Figure 3:
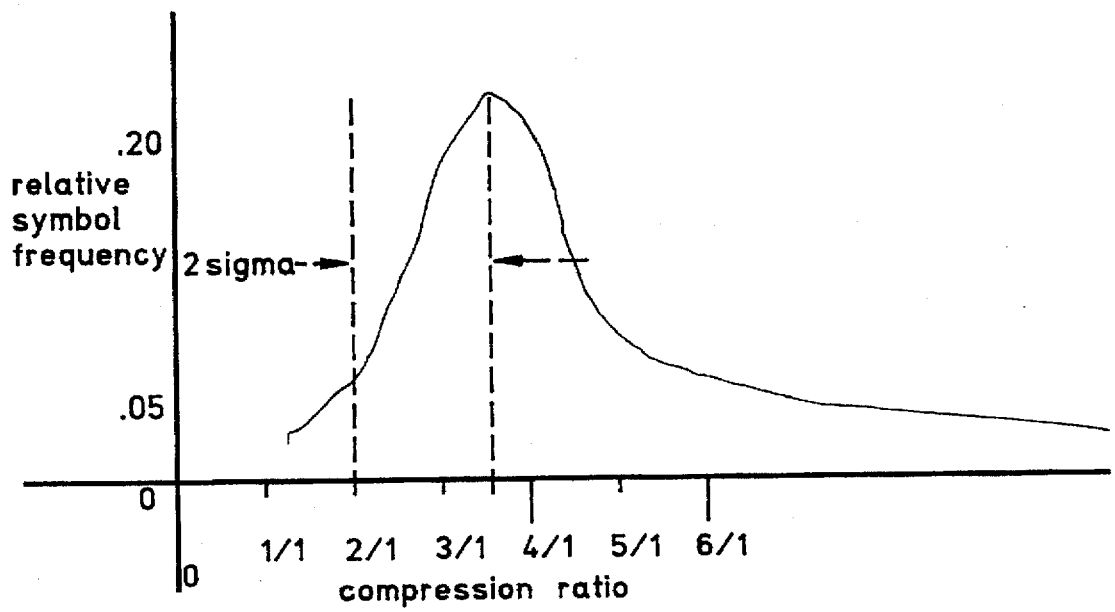
FIG. 3 depicts a relative frequency of occurrence of symbols selected from a predetermined alphabet superimposed on a partially ordered range of compression ratios.

Referring now to FIG. 3, there is shown a global zero order Gaussian or Laplacian probability distribution of occurrence for say English language text symbols. Such global symbol probability distributions assume a characteristic skewed bell shaped curve as a function of their standard deviation. This curve has been superimposed on a partial ordering of compression ratios such that the symbols having a probability of occurrence two or more standard deviations from the mean in the lower tail will coincide with a positive compression ratio r. The ratio r resulting from this coincidence is used to determine initially the maximum compressed size of each of the linear address segments. That is, the compressed segment size=the uncompressed size/r. Since r is a lower bound, then symbol strings subject to higher compression are mappable into the segment with a high degree of probability. What is determinative is that a lower tail probability point be selected coinciding with a low compression ratio.

In this specification, the terms "linear mapped space", "linear extent" of N equal sized segments, and "primary band or region" are used synonymously as are "overflow space", "overflow extends", and "secondary band or region".

Figure 4:
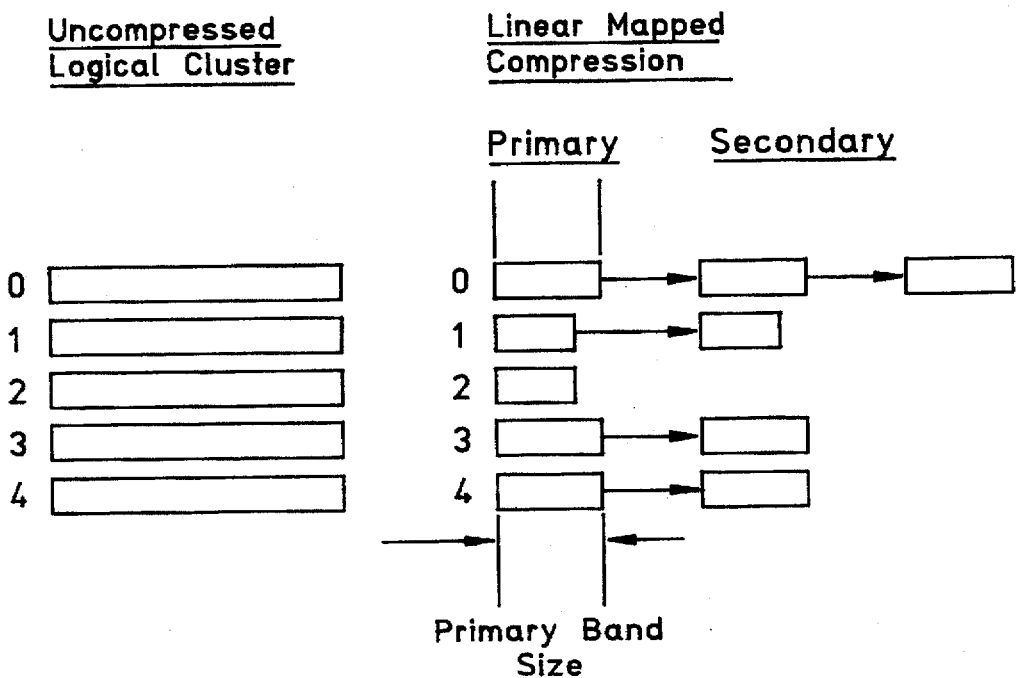
FIG. 4 sets forth the conceptual relations between uncompressed data and its linear mapped compressed counterpart according to the invention.

Referring now to FIG. 4, there is depicted five tracks or segments designated 0–4 of uncompressed symbol strings in a linear address space. These strings are mapped via compression into counterpart smaller sized segments into a linear mapped space of a like number but smaller sized equal length compressed segments+overflow segments. The combined size of the N compressed segments+the overflow segments remains constant even though the components may be periodically resized.

Because compression is a stochastic process, the compressed string length varies. The right hand side of FIG. 4 shows several of the scenarios. For instance, uncompressed segment 0 overflows linear segment 1 and requires up to two overflow segment spaces. In this regard, a linear segment and overflows are tied together as a linked list with the pointer to the first overflow segment being embedded in the linear segment and the pointer to the second overflow segment being embedded in the first overflow segment. Also, uncompressed segments 1, 3, and 4 are mapped into compressed segments of varying overflow size while uncompressed segment 2 has no overflow associated therewith. The problem is to periodically ascertain whether the linear mapped area should be resized up or down. The resizing either increases the space available to the N equal length compressed segments in the linear mapped space at a reduction in space available for overflow or vice versa. This modality accommodates changes in the zero or first order compression ratio statistics and in overflow or underflow changes in update writes of the segments.

Figure 5A:
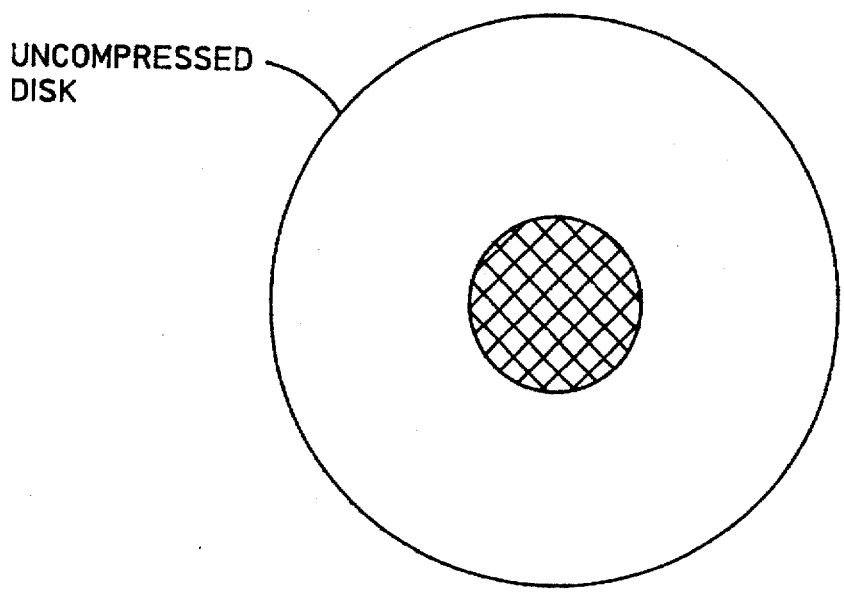
FIGS. 5A and 5B respectively illustrate a magnetic disk storing uncompressed blocks and partitioned into primary and secondary bands of linear and overflow regions and their projection onto a linear logical address space.
Figure 5A:
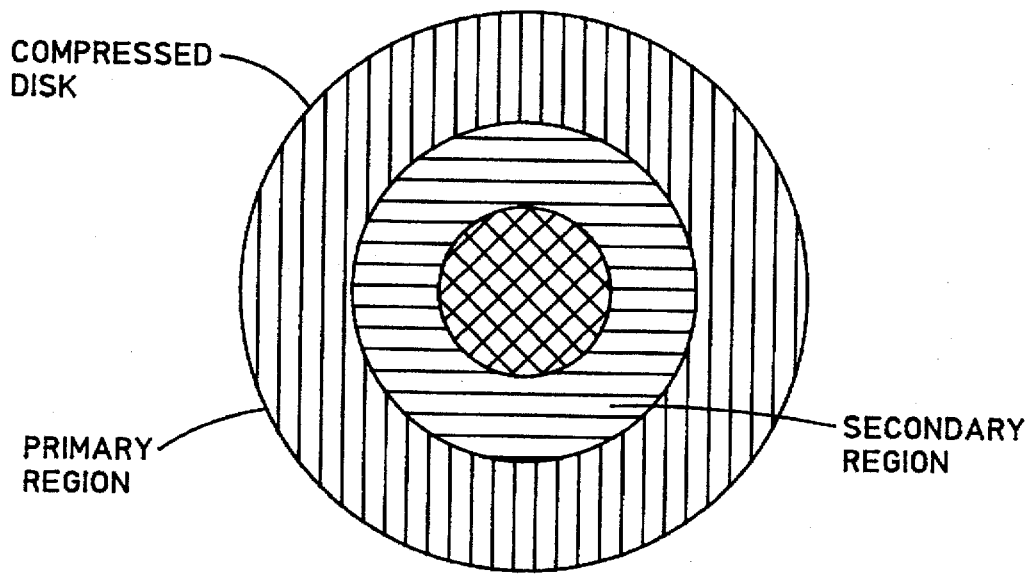
Figure 5B:
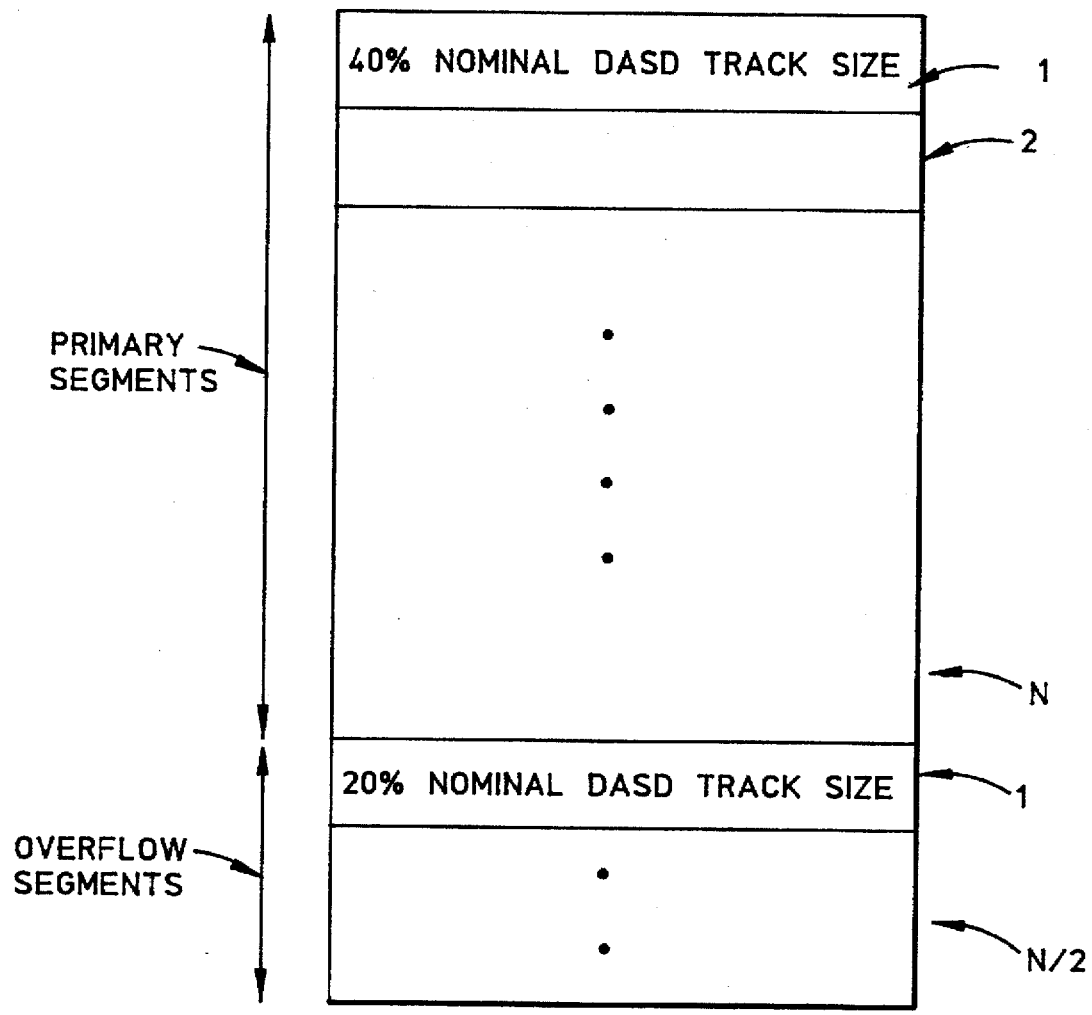

Referring now to FIG. 5A, there is shown one type of mapping of a disk storing segments of uncompressed symbol sequences onto a disk partitioned into a primary and secondary regions. A primary region of compressed linearly addressed segments occupies N outer tracks while a secondary region of N/2 inner tracks is initially reserved for overflow extensions. FIG. 5B depicts the mapping of the uncompressed tracks into N compressed primary segment counterparts in a logical level linearly addressable storage and any overflows into linked listed ones of N/2 secondary or overflow segments. For 100 megabyte uncompressed storage, this would be mapped into a space 40% of its original size assuming a nominal compression ratio of 2.5/1. If ½ of the original space is assigned to overflow, this would map into 20% of the original space under 2.5/1 compression. It is clear that if the primary region is full and the overflow region is not, then the overflow region is underutilized. When the overflow region is full and the primary region is not, then the effective capacity decreases.

Figure 6A:
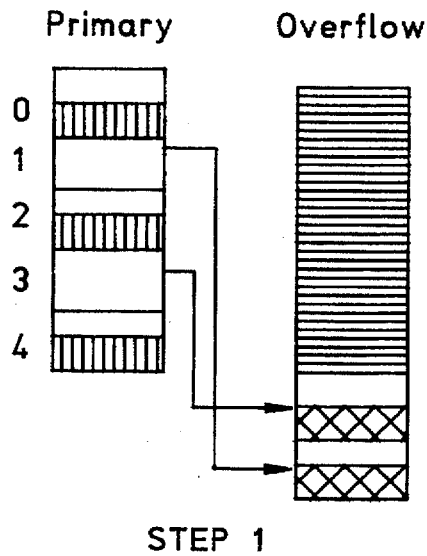
FIGS. 6A and 6B show dynamic resizing of the linear mapped and overflow regions according to the invention on a stepwise continuous basis.
Figure 6A:
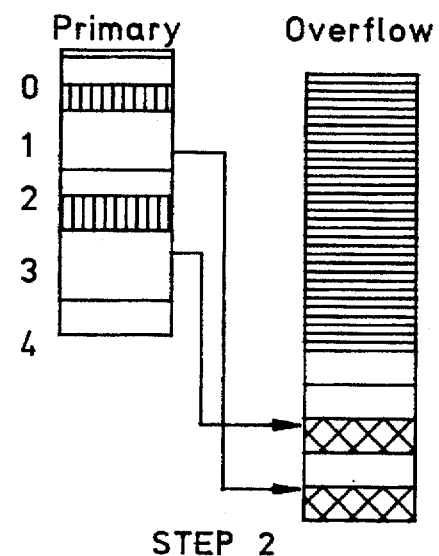
Figure 6A:
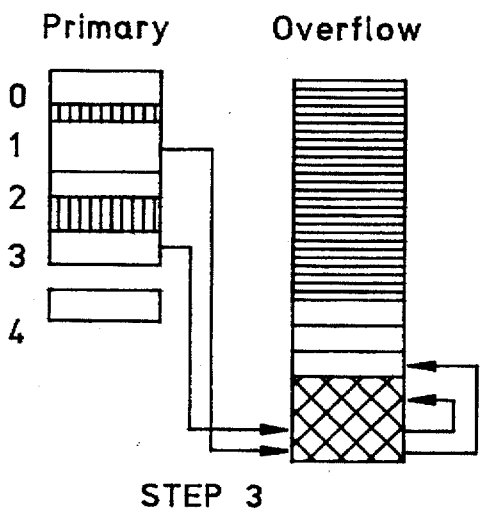
Figure 6A:
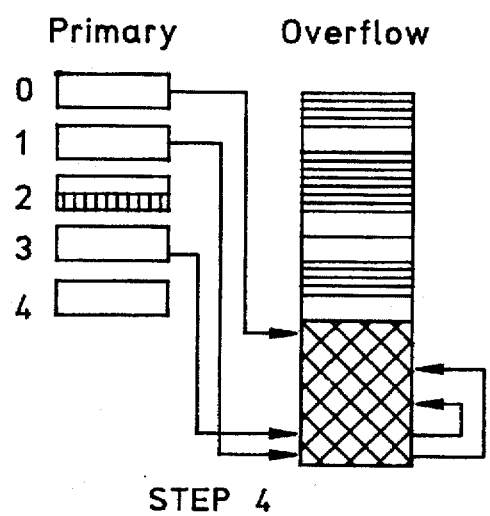
Figure 6B:
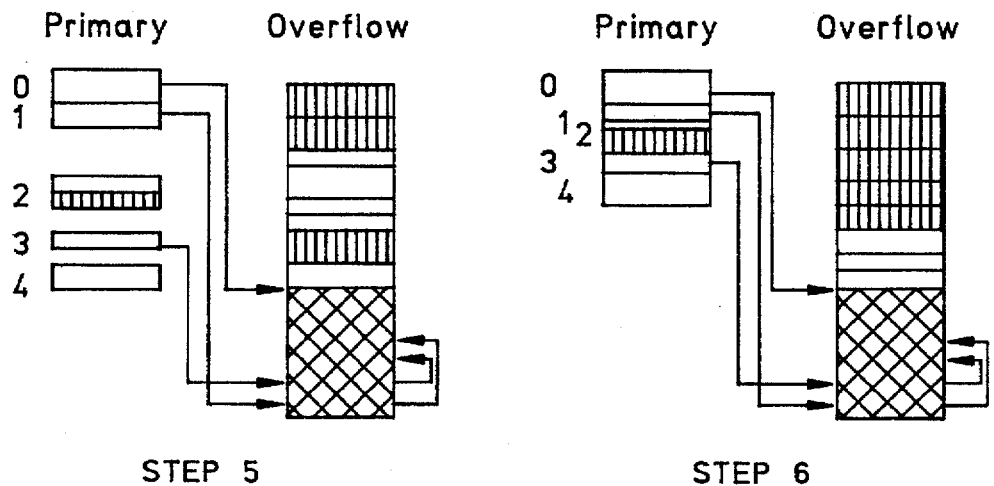
Figure 6B:
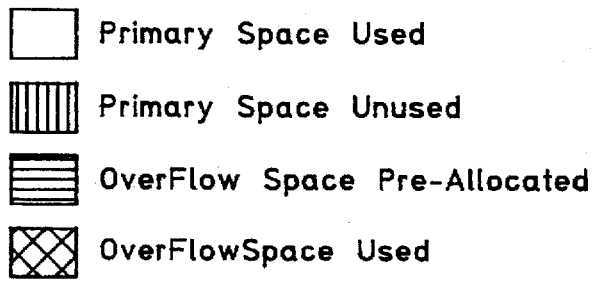

Referring now to FIGS. 6A and 6B, there is shown dynamic resizing of the linear mapped and overflow regions according to the invention on a stepwise continuous basis. The figures set out six steps indicating how resizing dynamically redistributes space as between the primary and overflow regions. As an aid in understanding, the space utilization is coded by different cross hatching as seen at the bottom of FIG. 6B.

Referring now to FIG. 6A, step 1, the primary segments or blocks are numbered 0 to 4. Blocks 1 and 3 have overflowed and are pointing to blocks in the Overflow region. Blocks 0,2 and 4 are not totally full. The Overflow region has two blocks assigned to the Primary blocks that needed additional space. Arrows are pointing to these Overflow blocks.

Per step 1, only has 4 overflow blocks are available for use by the Primary region.

The portion of the device driver processing the Overflow will be initialized to keep track of all the blocks on the disk. However the blocks that are actually assigned to the Primary region will be Pre-Allocated to the primary region. To the extent that the Overflow software management 'knows' about all the tracks makes it easier to free blocks back to the Overflow area.

Referring now to FIG. 6A, step 2, Block 4 has been "resized". That is, Block 4 is small enough to be resized without requiring any overflow blocks. Consequently, the one additional block unused by the Primary can be reassigned to the Overflow region. In FIG. 6A, step 3, Block 3 has been resized. Since Block 3 was already large enough to require an additional Overflow Block, an arrow is inserted pointing from the Overflow block to another Overflow block. After Block 3 resizing, the unused Primary blocks can be freed by the Overflow region.

Referring now to FIG. 6A, step 4, there is shown the resizing all the blocks. Note, the final resizing of block 1 resulted in free blocks at the very "top" of the Overflow. Relatedly, in FIG. 6B, step 5, block 1 is moved to the free block at the very top of the Overflow. This flees the unused primary blocks for the Overflow. Lastly, FIG. 6B, step 6, shows the final results of resizing and then moving of the Primary blocks. There are still 5 Primary blocks, however they are in a smaller contiguous area. Since the Primary Blocks are smaller that there is a higher possibility of Overflow (as in block 0 overflowing) and that additional Overflow blocks may be used by either the Primary or Overflow.

Client/Server Device Driver Preferred Embodiment As Expressed In C++Commented Code Operationally, the management of a storage subsystem is expressed in the form of software subsystem and device drivers modeling a client/server interaction. Thus, the invention can be practiced at either the array control unit 3 or at the level of the DASDs 27–35. In either case, the code resident at the array controller or each of the devices would include an initializer, an interrupt handler, a monitor, and a server. The software implementations of the initialization, handler, monitor, and server functions set out in the following paragraphs of this specification are in the form of commented C++ source code.

C++ is an object oriented programming language system forming a superset of the C language. Attributes of the language such as objects, classes, inheritance, polymorphism, overloading and its syntactical and reserved word conventions are described in many works such as Lafore, "Object Oriented Programming In Microsoft C++ ", copyright 1992 by the Waite Group Press, Corte Madera CA or Dave Mark, "Learn C++ On The PC", copyright 1994 by the Addison-Wesley Pub. Co. In C++ both "/* - - - */" and "//---" operate as comment tokens.

It should be appreciated that several software threads of execution can coexist in a subsystem concurrently. The concept of a single thread in software connotes one or more processes in a demand/response relationship such as a server responding to a service request from an operating system. An independent thread is one with no necessary dependency on any other thread even though it may be concurrently invoked. In this invention, the monitor for assessing and resizing the linear mapped space is invoked by the operating system on some event basis such as predetermined times or intervals registered by the system clock. On the other hand the server, continually spins awaiting accessing commands sent form the host CPU down through the subsystem.

A driver resident at a DASD includes the following generalized functions in C++ notation:

FIELDNAMES(
Init() ;;
- - Initializes the device driver
)ENDRECORD
InterruptHandler();ENDFIELD
- - Handles InterruptsENDFIELD
ENDRECORD
Server();ENDFIELD
- - Services requests from the OSENDFIELD
ENDRECORD The server will create the disk object which will manage the data on the entire disk. In the code sequence set out in TABLE 2, The Disk Object creates a single Primary Band and a single Overflow Band. The operating system starts an independent thread called a Monitor. The Monitor thread will periodically evaluate whether the number of Overflows are too big or too small. It will then resize the Primary area by calling Resize. In turn, Resize either calls MarkSmaller or MakeLarger to adjust the Primary band. These functions call the Band functions Resize, Move, Pack and Reserve member functions.

When the Monitor thread is invoked it causes the Server thread to become suspended for the resizing duration. Because resizing can occur over a considerable period of time, it can be scheduled opportunistically or periodically in order to avoid significant disruption to accessing operations.

The Server portion of the main thread of the driver at the device level after initialization executes an infinite DO/WHILE loop. This is expressed in TABLE 1 in commented C++ source code:

Table 1:

```
/*----------------------------------------------------*/
/* Start of the device driver                       */
/*----------------------------------------------------*/ main(Packet *p)
{
    Init(p);        // Initialize the device driver
                    // Determine the number of cylinders,
                    // tracks and heads
    Server();       // Server will actually do the work
}
```

```
/*---------------------------------------------------*/
/* The Server will stay in a loop looking for work from the operating system*/
/* The command may require that the hardware is started and the process put */
/* to sleep until an interrupt occurs. If a process is put to sleep, then    */
/* 'id' (a unique value) will be passed to the operating system as the key   */
/* to use when waking up                                                     */
/* Since the timer can go off at any time, the monitor function can be       */
/* invoked in the middle of a READ/WRITE operation. The READ/WRITE           */
/* operations should use the LOCK/UNLOCK functions to protect critical       */
/* sections of code.                                                         */
/*---------------------------------------------------*/ void Server()
{
  disk = new Disk(cyls, heads, sectors);  // First create the disk
  do {
    Packet *p = GetRequest();     // Get some work from the Operating system
                                  // Sleep if there's no work
    switch (p->Command)           // Got some work to do
    {
    case (READ) :
      disk->Read(p);              // Read from the disk
                                  // Set id = p if this process is going to
                                  // sleep
      break;
    case (WRITE) :
      disk->Write(p);             // Write to the disk
                                  // Set id = p if this process is going to
                                  // sleep
      break;
    case (FORMAT) :
      disk->Format(p);            // Write to the disk
      break;
    case (SHUTDOWN) :
      disk->ShutDown();
    }
    p->Command = COMPLETED;       // Return the status
    SendRequest(p);               // Send back to the operating system
  } while (true);                 // Do it forever
}

/*---------------------------------------------------*/
/* All interrupts will actually be intercepted by the Operating System (OS).*/
/* If an interrupt handle is registered to the OS, then the OS will call    */
/* the registered handler.                                                  */
/*                                                                          */
/* Execution will be preempted by the interrupt handler when an interrupt   */
/* is generated. The Interrupt handler will handle interrupts from either   */
/* the device hardware or the timer                                         */
/*---------------------------------------------------*/ int InterruptHandler(int p)
{
  interrupttype = (Interrupt)Inp(INTERRUPTREG);  // Read the interrupt register
```

```
        if (interrupttype == DEVICE)     // Interrupted from the device ?
        {
          if (id)                        // Is there a sleeping process ?
          {
            id = 0;                      // Initialize the id for the next time
            Run(id);                     // Yes, so start it running again
          }
        }
        if (interrupttype == TIMER)      // Interrupted from the Timer ?
        {
          disk->Monitor();               // Yes, so call the monitor
          SetTimer();                    // Restart the timer
        }
        return true;
      }

/*---------------------------------------------------*/
      /* Do a one time initialization of the device        */
      /*---------------------------------------------------*/ void Init(Packet *p)
      {
        id = 0;                          // No processes sleeping yet
        ParseParms(p);                   // Parse the parameters
        Register(INTERRUPTNUM,InterruptHandler);  // Let the operating system know which
                                         // program will be handling interrupts
        SetTimer();                      // Start the timer interrupt
      }
```

Table 2:

```
      /*---------------------------------------------------*/
      /* Device Driver structure for a Linear Mapped Disk  */
      /*                                                   */
      /* Copyright 1994 by IBM                             */
      /*---------------------------------------------------*/ define  OVERFLOWLIMIT      .25
      #define  UNDERFLOWLIMIT     .05
      #define  DEFAULTCOMPRESSION  2 enum bool {false, true};    // define some usefull boolean types

/*---------------------------------------------------*/
      /* Define the structures for the Primary and Overflow Blocks */
      /*---------------------------------------------------*/ typedef struct {
        int CompressedSize;
        int Next;                 // Point to a overflow Block
```

```
        int BlockSize;          // Size of this Primary Block
        char DataÖ1þ;                // An Array of the compressed data
                                // the array is larger than 1 byte
    } Primary_Block;

typedef struct {
        int Prev;               // Point to the Primary/Prev Overflow Block
        int Next;               // Point to the next Overflow Block
        int BlockSize;          // Size of this Overflow Block
        char DataÖ1þ;                // An Array of the compressed data
                                // the array is larger than 1 byte
    } Overflow_Block;

typedef struct {            // Define a logical Sector ID
        int Cylinder;
        int Head;
        int Sector;
    } SecID;

/*---------------------------------------------------*/
    /* Define the packet received from the operating system       */
    /*---------------------------------------------------*/ enum Cmnd {WRITE, READ, SHUTDOWN, COMPLETED, ERROR}; // Define the
    commands allowed
    typedef struct {
        Cmnd Command;           // The Command
        SecID Id;               // The sector ID
        char *Datap;            // A pointer to the data
    } Packet;

/*---------------------------------------------------*/
    /* Define an object which will keep track of an array of things. Each    */
    /* thing is either allocated or free.                          */
    /*---------------------------------------------------*/ class BitMap {
        public:
            BitMap(int Size);
            int GetBlock();              // Get the next free block
            int FreeBlock(int);          // Mark a block as free
            BitMap *Split(int start);    // Split a bitmap
            bool Reserve(int, int);      // Reserve a block,
            unsigned int *GetList();     // Get ready to dump the array
            void SetList(int,int*)       // Restore the array
            int GetNumTaken(){return NumTaken;}
        private:
            int NumBits;                 // Number of things
            int NumInts;                 // Number of integers in the array
            int NumFree;                 // Number of things free
            int NumTaken;                // Number of things taken
            unsigned int *FreeBlockList; // Array to keep track of
                                         // what's been taken
    };
```

SA9-94-075

```
/*--------------------------------------------------*/
/* Define an object which will map logical ids into physical locations   */
/*                                                   */
/* The physical id = starting sector + logical id * size                 */
/* Note: size can be either negative or positive                         */
/*--------------------------------------------------*/ class Map {
  public:
    Map(int start, int size) {
      StartingSector = start, Size = size;
    }
    int GetPhysicalLocation(int logicalid) {
      return (StartingSector+logicalid *Size);
    }
    int GetLogicalID(int physicalsector) {
      return ((physicalsector-StartingSector)/Size);
    }
  private:
    int StartingSector;      // Starting Physical Sector
    int Size;                // Number of sectors per logical id
};

/*--------------------------------------------------*/
/* Define an object which will manage the data within a range of logical */
/* ids                                               */
/* A band will deal entirely with logical id's, logical id's will be     */
/* mapped to physical id's using the 'map' that is unique to each band   */
/*--------------------------------------------------*/ class Band {
  public:
    Band(Map *m, int start_id, int size);
    bool Search(int logical_id);       // return true if the logical id
                                       // is within the band
    bool Read(int logical_id, int *data);  // Read the data
    bool Write(int logical_id, int *data); // Write the data /* Special functions used to manage bands                       */ bool Resize(int, int);             // Change the Block Size
                                       // of a block, Read the block,
                                       // chamge the size, then free
                                       // unused blocks
    bool Pack(int);                    // Move the block
                                       // physically adjacent to
                                       // the last block
                                       // free the old space.
    bool Move(int Source, int Destination);// Move a band to a new
                                       // location
    void Reserve(int start, int num);
    bool Free(int start, int size);    // Make some id's available
    bool Free(void);                   // Make all id's available
                                       // Return when they're all
```

```
                                // reserved
         Band *Split(int start_id, int size);   // Split the band into two
                                // return the next band
         Band *Merge(Band *nextband);          // Merge two bands into one
                                // if they are contiguous
                                // return the first band
         int GetStartLocation(void)    {return Start;}
         int GetPhysicalLocation(int i){return map->GetPhysicalLocation(i);}
         int GetLogicalID(int i)       {return map->GetLogicalID(i);}
         int GetEndLocation(void)      {return (Start+Size); }
         int GetSize(void)             {return Size; }
         int GetBits(){return Bits->GetNumTaken();}
       private:
         Map *map;             // Method used to locate the physical location
         Band *Next;           // Point to the next band
         Band *Previous;       // Point to the Previous
         int Start;            // Keep track of the starting id
         int Size;             // Keep track of the size of an id
         int Flags;            // Internal information
         int Seek(int logical_id);     // Seek to a logical_id
                               // Return a physical_id
         BitMap *Bits;         // Keeps track of used
                               // id's
    };

/*---------------------------------------------------------------*/
/*  Define the disk object. The disk object will point to primary    */
/*  and overflow bands. The highest level functions will be handled by */
/*  the disk object.                                                 */
/*  A disk object will only need to know the disk physical attributes. */
/*---------------------------------------------------------------*/ class Disk {
      public:
        Disk(int cyl, int heads, int sectors);
        bool ShutDown(void);      // Prepare for power off
        bool Restore();           // Restore from power off
        bool Format(void);        // Format the disk
        bool Read(Packet *);      // Read the disk
        bool Write(Packet *);     // Write the disk /*
        Special functions used to reconfigure the primary and overflow
        bands.
                                  */ void Resize(int);
        void MakeSmaller(int);    // Make the primary
                                  // blocks smaller
        void MakeLarger(int);     // Make the primary
                                  // blocks larger
      private:
        void GetEvent();          // Go to sleep for awhile
        void StartMonitor();      // Start the monitor task
```

```
        void Monitor(void);         // Updates the block size as needed
        int AccessTime;             // Keeps track of the access time
        int Overflows;              // Keeps track of the number of Overflows
        int Primary_Size;
        int OverFlow_Size;
        Band *Primary;              // Point to the Primary Band
        Band *Overflow;             // Point to the Overflow Band
        int *Compress(int *data, int size); // Compress the data
                                    // or overflow bands
    };

/*-----------------------------------------------------------*/
    /* Create the disk object                                    */
    /* Pass in the number of cylinders, heads and sectors/head   */
    /* for a disk                                                */
    /*-----------------------------------------------------------*/

Disk::Disk(int cylinders,int heads,int sectors)
    {
      Map *m;
      int size = sectors;           // Compress whole tracks
      int numtracks = cylinders *heads;   // Number of tracks /*-----------------------------------------------------------*/
    /* Create the Primary Area                                   */
    /* Start by compressing entire tracks of data. So the number of Primary */
    /* blocks will be equal to the number of tracks, and the size of each   */
    /* Primary block will be equal to a fraction of a track      */
    /*-----------------------------------------------------------*/ int PrimaryBlockSize = sectors/DEFAULTCOMPRESSION;

m = new Map(0, PrimaryBlockSize);     // Create the map for the Primary region
        Primary = new Band(m, 0, numtracks);  // Now create the Primary region /*-----------------------------------------------------------*/
    /* Now Create the Overflow area                              */
    /* It makes it easier to have the Overflow area cover the entire disk, */
    /* but allocate the overflow area that covers the Primary area */
    /*-----------------------------------------------------------*/ int LastSector = cylinders *heads *sectors;

m = new Map(LastSector, -1);          // Keep track of each sector
        Overflow = new Band(m, 0, LastSector-1); // Create the Overflow area /*-----------------------------------------------------------*/
    /* Now reserve the Primary area                              */
    /*-----------------------------------------------------------*/ int LastTrack = Primary->GetPhysicalLocation(numtracks+1);
        int FirstTrack = Primary->GetPhysicalLocation(1);
        int FirstID = Overflow->GetLogicalID(LastTrack);
        int LastID = Overflow->GetLogicalID(FirstTrack);
```

```
    int numids = LastID-FirstID;

Overflow->Reserve(FirstID, numids);    // Allocate to the Primary area
    StartMonitor();                         // Start the monitor as
                                            // a seperate task
}

/*---------------------------------------------------------------*/
/* Wake up every now and then and evaluate the disk to determine if    */
/* the Primary Blocks should be made smaller or larger                 */
/*---------------------------------------------------------------*/ void Disk::Monitor()
{
  int Size;
  do {                      // Loop forever
    GetEvent();             // Go to sleep for a while
    Overflows = Overflow->GetBits();   // Get the number of Overflows
    if (Overflows >Primary_Size *OVERFLOWLIMIT) // Too Many Overflows ?
    {
      Size = Primary->GetSize();    // Resize the primary
      Size *= 2;                    // blocks
      Resize(Size);
    }
    if (Overflows < Primary_Size *UNDERFLOWLIMIT) // Not enough overflows ?
    {
      Size = Primary->GetSize();    // Resize the primary
      Size /= 2;                    // blocks
      Resize(Size);
    }
  } while (true);
}

/*---------------------------------------------------------------*/
/* Determine if the Primary area should be made larger or smaller      */
/*---------------------------------------------------------------*/ void Disk::Resize(int newsize)
{
  if (newsize < Primary->GetSize())
    MakeSmaller(newsize);
  if (newsize > Primary->GetSize())
    MakeLarger(newsize);
}

/*---------------------------------------------------------------*/
/* Make all the Primary blocks smaller, then pack the primary blocks   */
/* into one contiguous area                                            */
/*---------------------------------------------------------------*/ void Disk::MakeSmaller(int newsize)
{
```

```
        int i;
        int StartLocation;
        int EndLocation;

5       StartLocation = Primary->GetStartLocation(); // Get the starting logical id
        EndLocation = Primary->GetEndLocation(); // Get the ending logical id 10
        /*----------------------------------------------------------*/
        /* First Change the Primary Size for each Location, changing the   */
        /* size will require that the Location be Read, the size changed,  */
        /* Blocks freed up, and then written back.                         */
15      /* Start with the last location first, that way there will be enough */
        /* overflow blocks                                                 */
        /*----------------------------------------------------------*/ for (i = EndLocation; i = StartLocation; --i)
20        Primary->Resize(i, newsize);

/*----------------------------------------------------------*/
        /* All the Clusters have been resized, but, they are not in their  */
        /* new home location (except for thr first one), so now pack       */
25      /* all the clusters into one contiguous region                     */
        /*----------------------------------------------------------*/ for (i = StartLocation+1; i = EndLocation; ++i)
          Primary->Pack(i);
30      }

/*----------------------------------------------------------*/
        /* Make all the Primary blocks larger by reserving some blocks in the */
        /* overflow area and then writting the data into the overflow area    */
35      /*----------------------------------------------------------*/ void Disk::MakeLarger(int newsize)
        {
          int i;
40        int LogicalID;
          int PhysicalLocation;
          int StartLocation;
          int EndLocation;

45        StartLocation = Primary->GetStartLocation();
          EndLocation = Primary->GetEndLocation();
          for (i = EndLocation; i = StartLocation; --i) {

/*****************************************************************/
50        /* First Request space in the Overflow area, this is where the primary */
          /* block will be moved.                                           */
          /*****************************************************************/
          // Get the physical location
```

SA9-94-075

```
      PhysicalLocation = Primary->GetPhysicalLocation(i);
      // Now map the physical location into the logical location in
      // the overflow area
      LogicalID = Overflow->GetLogicalID(PhysicalLocation);
      Overflow->Reserve(LogicalID, newsize);
      Primary->Move(i, LogicalID);       // Move the Primary Block
      Primary->Resize(i, newsize);       // Resize the Block, it should fit
    }
  }

/*------------------------------------------------------------*/
/* Globals                                                  */
/*------------------------------------------------------------*/ int cyls;              // Number of cylinders on the disk
int heads;             // Number of heads
int sectors;           // Number of sectors
Disk *disk;            // An object that will manage the disk /* The entire disk will be considered an array of blocks           */

Overflow_Block *OverFlowBlocks;
Primary_Block *PrimaryBlocks;
              // manage the disk /*------------------------------------------------------------*/
/* Function Prototypes                                      */
/*------------------------------------------------------------*/ void Init(void);                  // Initialize the device driver
void InterruptHandle(void);       // Handle Interrupts
void Server(void);                // Service requests
Packet *GetRequest();
void SendRequest(Packet *);

/*------------------------------------------------------------*/
/* Start of the device driver                               */
/*------------------------------------------------------------*/ main(int argc,char *argvÖþ)
{
  Init();   // Initialize the device driver
            // Determine the number of cylinders, tracks and heads
  Server(); // Server will actually do the work
}

/*------------------------------------------------------------*/
/* The Server will stay in a loop looking for work from the operating system*/
/*------------------------------------------------------------*/ void Server()
{
  disk = new Disk(cyls, heads, sectors); // First create the disk
```

```
     do {
       Packet *p = GetRequest();   // Get some work from the Operating system
                                   // Sleep if there's no work 5      switch (p->Command)         // Got some work to do
       {
         case (READ) :
           disk->Read(p);          // Read from the disk
           break;
10       case (WRITE) :
           disk->Write(p);         // Write to the disk
           break;
         case (SHUTDOWN) :
           disk->ShutDown();
15     }
       p->Command = COMPLETED;     // Return the status
       SendRequest(p);             // Send back to the operating system
     } while (true);               // Do it forever
   }
20
```

Extensions

The method and means of this invention is extensible to any fixed size addressable storage space which is adjustable to minimize internal fragmentation, and where as here, the adaptation of the compression ratio for allocation in the primary region can be taken at a slower pace or as an off-line operation to preserve the linear mapping qualities.

This invention is extensible to any compression banding of a fixed size addressable storage space which uses late-binding to ensure host and storage subsystem information state consistency.

These and other extensions of the invention may be made without departing from the spirit and scope thereof as recited in the appended claims.

We claim:

1. A method of preserving locality of referencing of strings in a system for update writing-in-place of compressed images of fixed length symbol strings in counterpart addresses in a bounded (constant sum) addressable storage medium, the method comprising the steps of:
    (a) partitioning the bounded addressable storage medium into N1 segments in a linearly addressable space and N2 segments in a linked list addressable space, each segment in N1 being of a first length less than an estimated average uncompressed symbol string length, each segment in N2 being of a second length less than the estimated average uncompressed symbol string length;
    (b) populating segments in N1 one-to-one and ONTO with compressed images of ones of the fixed length symbol strings;
    (c) updating-in-place ones of the compressed images of the fixed length symbol strings stored among said N1 address segments including:
        (1) writing portions of any compressed symbol string image exceeding the size of the segment in N1 to which it is addressed into one or more counterpart segments in N2, and
        (2) embedding a token in the counterpart segment in N1 pointing to the segment or segments in N2; and
    (d) recursively adjusting the size of all of the segments in N1 in a direction so that the number of segments in N2 lie within a predetermined percentage range of the current number of segments in N2.

2. The method according to claim 1, wherein recursive step (d) includes repeating steps (b)–(d) on either an opportunistic or periodically scheduled basis.

3. A method for updating in place and rewriting compressed images of strings into a storage medium in a system responsive to fixed length strings generated by a plurality of dynamic Markov symbol string sources and means for writing compressed images of said fixed length strings into counterpart addresses of a fixed sized cyclic storage medium, the method comprising the steps of:
    (a) determining a compression ratio bound r as the superimposition of a global Gaussian or Laplacian symbol probability distribution having a lower tail over said string sources onto a partially ordered range r0, r1, . . . , rm, . . . of compression ratios;
    (b) partitioning said fixed size cyclic storage medium into N1 linearly addressable segments and N2 linked list addressable segments, each of the N1 segments approximating the size of a constant block, record, or track of symbols divided by the compression ratio bound r coincident at a predetermined standard deviation in the lower tail (2 Sigma) of said distribution;
    (c) populating ones of the segments in N1 one-to-one and ONTO with compressed images of ones of said fixed length symbol strings,
    (d) updating the strings in place in ones of the segments in N1 including:
        (1) writing portions of any compressed images exceeding the size of the segment to which they are addressed in segments in N1 into one or more counterpart segments in N2, and
        (2) embedding a token in the counterpart segment in N1 pointing to the segment or segments in N2; and
    (e) recursively adjusting the size of all of the segments in N1 in a direction so that the number of segments in N2 lie within a predetermined percentage range of the current number of segments in N2.

4. The method according to claim 3, wherein recursive step (e) includes repeating steps (b)–(d) on either an opportunistic or periodically scheduled basis.

5. The method according to claim 3, wherein the predetermined percentage range in step (e) lies between 1% and 5% inclusively.

6. The method according to claim 3, wherein step (e) is executed on a periodic or opportunistic schedule, and further wherein step (e) includes one of the steps selected from the set consisting of
    (1) reclaiming segments for use in N1 from segments assigned to N2 where the segment size in N1 is being increased, and
    (2) reclaiming segments for use in N2 from segments assigned to N1 where the segment size N1 is being decreased.

7. A method for preserving locality of referencing strings in a bounded addressable storage medium in a system for update writing-in-place of compressed images of fixed length symbol strings in counterpart addresses in the bounded (constant sum) addressable storage medium, the method comprising the steps of:
    (a) partitioning the bounded storage medium into N1 segments in a linearly addressable space and N2 segments in a linked list addressable space, each segment in N1 being of a first length<an estimated average uncompressed symbol string length, each segment in N2 being of a second length<the estimated average uncompressed string length;
    (b) populating segments in N1 one-to-one and ONTO with compressed images of ones of the fixed length symbol strings;
    (c) updating-in-place ones of the compressed images of the symbol strings stored among said N1 address segments including:
        (1) writing portions of any compressed symbol string image exceeding the size of the segment in N1 to which it is addressed into one or more counterpart segments in N2, and
        (2) embedding a token in the counterpart segment in N1 pointing to the segment or segments in N2; and
    (d) recursively adjusting the size of all of the segments in N1 in a direction so that the number of segments in N2 lie within a predetermined percentage range of the current number of segments in N2, said recursive adjustment of size including either
        (1) reclaiming segments for use in N1 from segments assigned to N2 where the segment size in N1 is being increased, and
        (2) reclaiming segments for use in N2 from segments assigned to N1 where the segment size N1 is being decreased.

8. The method according to claim 7, wherein the predetermined percentage range in step (d) lies between 1% and 5% inclusively, and further wherein recursive step (d) includes the step of executing steps (b)–(d) is on a periodic or opportunistic schedule.

9. In a storage subsystem having a plurality of cyclic storage devices and a control unit coupling said cyclic storage devices and responsive to commands for moving uncompressed data between said control unit and an attached CPU, each cyclic storage device having means for compressing symbol strings as each string is recorded at addressable locations on the device, and means for generating uncompressed images from said recorded symbol strings stored at addressable locations on said device, wherein the improvement comprises:

means for partitioning a constant size address space over said devices into a plurality of linear addressable segments and a plurality of link list addressable segments, the size of each linear addressable segment being an average estimate length of a compressed symbol string;

means for populating one-to-one and ONTO the linear addressable segments over the devices;

means at each device for updating-in-place selected ones of said linear addressable segments, for writing portions of any compressed symbol string exceeding the size of the linear addressable segment into one or more counterpart link list addressable segments, and for embedding a token in the counterpart linear addressable segment pointing to the link list addressable segment or segments; and means for recursively adjusting the size of all of the linear addressable segments in a direction so that the number of link listed segments lie within a predetermined percentage range of the current number of link listed segments.

10. In the storage subsystem according to claim 9, said means for recursive adjustment of size includes:

means at each device for reclaiming link list addressable segments for use as linear addressable segments where the linear addressable segment size is being increased, and means at each device for reclaiming linear addressable segments for use as link list addressable segments where the linear addressable segment size is being decreased.

\* \* \* \* \*